AUTOMATIC FREQUENCY CONTROL CIRCUIT

Filed Feb. 27, 1952

INVENTOR
Gordon L. Fredendall
BY
[signature]
ATTORNEY 2,714,132

AUTOMATIC FREQUENCY CONTROL CIRCUIT

Gordon L. Fredendall, Huntingdon Valley, Pa., assignor to Radio Corporation of America, a corporation of Delaware Application February 27, 1952, Serial No. 273,691

4 Claims. (Cl. 178—69.5)

This invention relates to apparatus for controlling the frequency of the local oscillator in a television receiver.

According to the presently accepted television standards for the transmission of television signals the video carrier is placed at the 50% amplitude response point of the low frequency end of the frequency characteristic of the transmitter. The only limitation on the upper video frequency range limit is that it not disturb the audio carrier that is placed 4½ mc. above the video carrier. In certain color television systems, the exact shape and extent of the upper end of the frequency characteristic is important. For example, in one such system the color information is carried by a subcarrier that is placed at or near the 50% amplitude response point of the upper end of the transmitter frequency characteristic. In receivers adapted to reproduce images from such a signal it is desirable that the frequency response of the intermediate frequency amplifier (I. F.) with respect to the transmitted signal bear this same relationship to the video and color carriers. Assuming that the response characteristic of the receiver varies only with the frequency of the local oscillator, the receiver can be tuned by changing the frequency of the local oscillator so as to place the video carrier and the color carrier at the desired 50% amplitude response points.

It is accordingly an object of the present invention to provide an improved means for controlling the frequency of the oscillator at a receiver.

It is a further object of the invention to provide an improved means for controlling the frequency of the local oscillator in such a manner that the frequency response characteristic of the receiver as a whole will be symmetrically oriented with respect to two carriers.

Briefly these objectives may be achieved by developing a control signal representing the algebraic difference between low frequencies of known amplitude in the vicinity of the video carrier and high frequency signals of known amplitude in the vicinity of the color carrier and employing this control signal in such manner as to control the frequency of the local oscillator. The local oscillator then makes the position of the frequency response characteristic of the intermediate frequency amplifier change relative to the video carrier and the color carrier so as to equalize the low and high frequency response. Although this principle may be applied in many different systems, it is especially useful in a color television system wherein the color synchronization between the transmitter and receiver is effected by placing a burst of high frequency energy on a pedestal during the back porch interval. The pedestal is comprised of low frequencies and is always of uniform height and the burst is always of the same amplitude. These two signals represent the low and high frequency signals that are to be compared in the receiver.

The manner in which these objectives may be realized will be better understood from a detailed consideration of the drawing in which.

Figure 1:
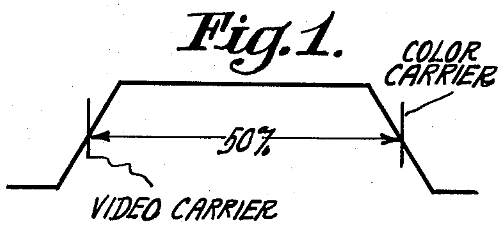
Figure 1 illustrates graphically the general type of frequency response characteristic being employed in the receivers with which the invention is adapted to operate.

Figure 1 illustrates the desired frequency characteristic of the receiver with which this invention is designed to cooperate. It will be noted that the overall shape of the characteristic may be described as being trapezoidal and that the video carrier is located half way up the slope of the low frequency end and that the color carrier is located half way up the slope of the high frequency end of the curve.

Figure 2:
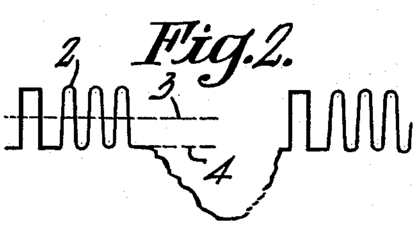
Figure 2 illustrates the type of signal normally transmitted to these receivers.

Figure 2 illustrates one type of signal that may be employed in such a color television system wherein a burst 2 of color carrier frequency is mounted on a pedestal which is the difference between the dotted line 3 and the blanking level 4. The pedestal is generally of such a type that the lower negative swings of the burst just touch the blanking level 4. Under such conditions the pedestal height is just half the peak-to-peak amplitude of the burst. This is only one way of inserting the burst into the television signal train and it will be understood that this invention can be employed regardless of the manner in which the insertion is accomplished.

Figure 3:
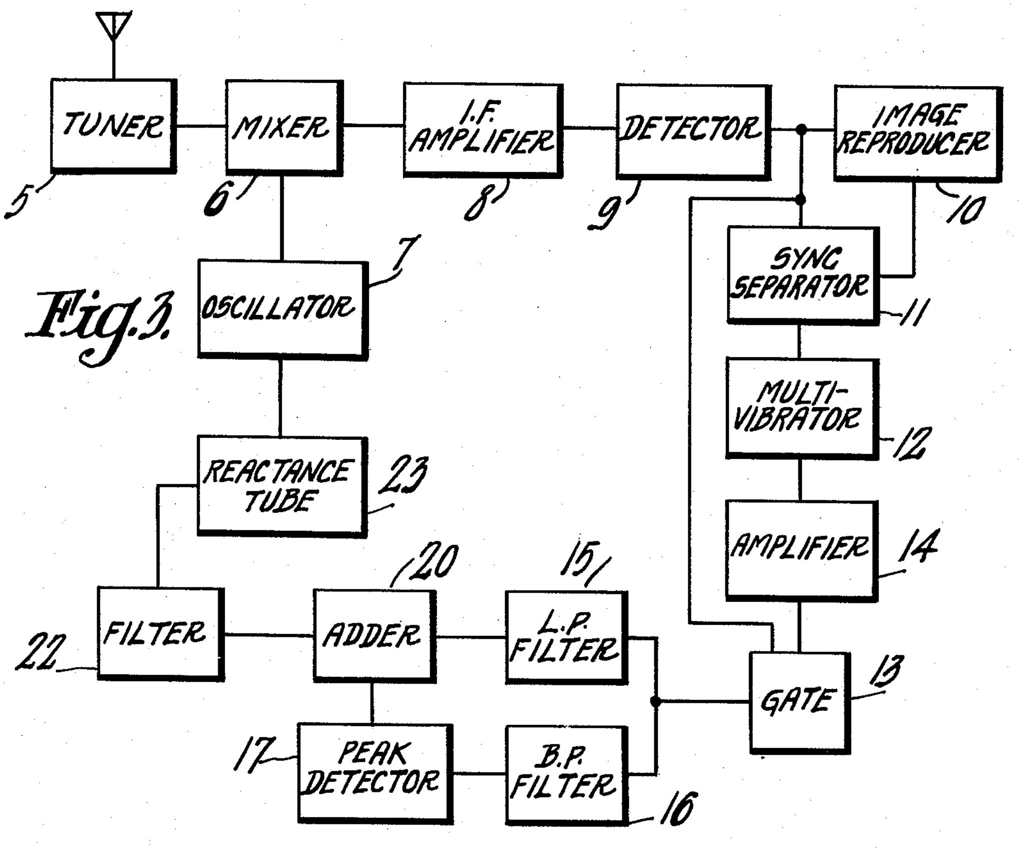
Figure 3 illustrates by block diagram the manner in which the present invention may be applied to such a receiver.

In the apparatus of Figure 3 the entire transmitted signal is selected by a standard tuner 5 and applied to a mixer 6, wherein it is heterodyned with the output of the local oscillator 7. The resulting products of modulation in an I. F. amplifier 8 have a characteristic such as illustrated in Figure 1 and the output of the I. F. amplifier 8 is detected in a second detector 9 before being applied to any suitable image reproducing means 10. The output of the detector 9 is applied to any form of standard sync separator 11 and the output of the sync separator is employed to synchronize the scanning action of the image reproducer 10.

In order to separate out the burst 2 of color synchronizing energy, the horizontal sync pulse is separated from the signal train by the sync separator 11 and is applied to a monostable multivibrator 12. The time constants of the multivibrator circuits are selected in a manner well known to those skilled in the art so that the multivibrator reverts to its stable position at or near the end of the burst 2. The pulse thus provided by the multivibrator 12 is applied so as to render a normally closed gate circuit 13 capable of passing signals applied to it. If the output of the detector 9 is applied to the gate 13 via lead 19 this means that all the signals occurring at the same time as the burst 2 are passed by the gate 13 and all those signals occurring at any other times are rejected by the gate 13. The amplitude of the pulse supplied by the multivibrator 12 to the gate 13 may be controlled by an amplifier 14 so that the gate 13 is capable of passing signals having amplitudes above any predetermined level. In the arrangement illustrated by Figure 1, the amplifier 14 has a gain such that the gate 13 passes signals immediately above the blanking level 4 of the signal train shown in Figure 2. Thus the signals passed by the gate 13 will include the burst 2 and the pedestal shown on which the burst is positioned.

The output of the gate 13 is applied to a low pass filter 15 and a band pass filter 16. The low pass filter has an upper frequency limit that is less than the mean frequency of the burst 2. However, inasmuch as the pedestal on which the burst resides occurs at a much lower frequency, that is the line recurrence frequency which is in the order of 15 kc., the voltage variations due to the pedestal are passed by the filter 15. The band pass filter 15 on the other hand is tuned to a narrow band frequency that is centered on the mean frequency of the burst and therefore does not pass the voltage variations due to the pedestals but only the burst frequency itself. The output of the band pass filter 16 is applied to a peak detector 17 which supplies square waves having amplitudes equal to half the peak-to-peak amplitude of the burst. The pulses supplied by the peak detector 17 are indicative of the response of the receiver I. F. ampifier 8 to the color carrier frequency represented by the burst and the pulses supplied by the low pass filter 15 are indicative of the response of the receiver I. F. amplifier 8 to the low frequency signals in the neighborhood of the video carrier. These two pulses are supplied to an adder 20 where they are algebraically combined and the resulting pulses supplied to a low pass filter 22 that serves to smooth them out and provide a control voltage indicative of the average algebraic difference between them. This control voltage is supplied to a reactance tube 23 that is connected with the oscillator in such a way as to control its phase and frequency. It can be seen that the oscillator will be thus adjusted to such a frequency that the video carrier and color carrier are symmetrically positioned with respect to the intermediate frequency amplifier pass band indicated in Figure 1. Even if the pass band should by some chance be too narrow the circuit arrangement just described will place it so that its response to the video carrier and to the color carrier will be equal.

Figure 4:
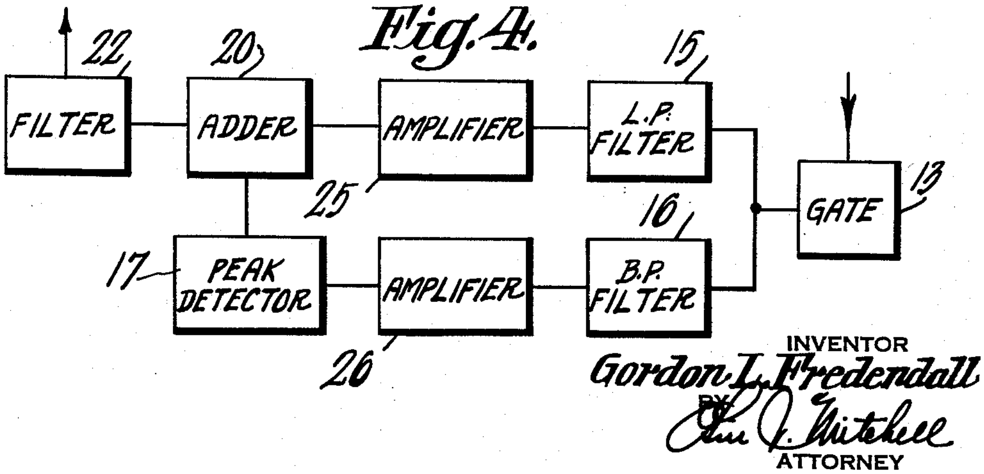
Figure 4 also illustrates by block diagram a slightly different arrangement for accomplishing the purposes of the invention.

The arrangement of Figure 4 illustrates the manner in which the position of the intermediate frequency amplifier pass band of the receiver with respect to the two carriers could be made such that one carrier is at a different response point than the other or in other words, in such a position that the response is not symmetrically located with respect to the two carriers. This can be accomplished by placing amplifiers 25 and 26 in the outputs of the low pass filters 15 and 16 respectively. For example, assume that it is desired to place the video carrier at a 75% response point and the color carrier at a 25% response point. The amplifier 25 which amplifies the output of the low pass filter 15 would then be adjusted so as to have less gain than the amplifier 26 that amplifies the output of the band pass filter 16. Thus when the outputs of the two amplifiers are equal the position of the response characteristic of the I. F. amplifier 8 with respect to the two carriers is at the I. F. level.

What is claimed is:

1. Apparatus for controlling the frequency of a local oscillator said local oscillator cause to provide a suitable heterodyne signal in a heterodyne circuit, said heterodyne circuit employed to heterodyne a composite signal having a low frequency component of fixed amplitude and a high component of fixed amplitude comprising in combination, means for separating said low frequency signal from said composite signal, means for separating said high frequency signal from said composite signal, signal adding means coupled between said low frequency separating means and said high frequency separating means for deriving a control signal representing the difference in amplitude between said low and high frequency signals, and an oscillator frequency controlling means coupled between said signal adding means and said local oscillator for controlling the frequency of said local oscillator in response to said control signal.

2. Apparatus for controlling the frequency of a local oscillator said local oscillator adapted to provide a suitable heterodyning signal in the first detector of a superheterodyne receiver, said superheterodyne receiver for receiving a composite signal having a low frequency component of fixed amplitude and a high frequency component of fixed amplitude comprising in combination, means for detecting said composite signal, a low pass filter having an upper frequency limit that is lower than the frequency of said high frequency signals coupled to said signal detecting means, a bandpass filter the central frequency of which is the same as said high frequency component coupled to said signal detecting means, means for detecting the amplitude of said high frequency component coupled to said band pass filter, an adder coupled between said low pass filter and said high frequency component amplitude detecting means, means for providing a control signal representing the algebraic difference between said high frequency component and said low frequency component, and an oscillator frequency controlling means coupled between said adder and said local oscillator for controlling the frequency of said local oscillator in response to said control signal.

3. In a television system wherein a burst of color synchronizing alternating current energy is inserted during the back porch interval of the transmitted signal, automatic frequency control apparatus for the local oscillator of a receiver adapted to respond to said signal comprising in combination means for detecting said signals, a normally closed gate circuit coupled to the output of said detecting means, means for rendering said gate circuit capable of passing signals during said back porch interval, a low pass filter having an upper frequency limit that is below the mean frequency of said burst, said filter being coupled to the output of said gate, a band pass filter adapted to pass a narrow band of frequencies centered on the mean frequency of said burst, said band pass filter being coupled to the output of said gate, a peak detector coupled to the output of said band pass filter, means for deriving a control signal representing the algebraic difference in amplitude between the output of the peak detector and the output of said low pass filter, and means for controlling the frequency of said oscillator with said control signal.

4. Apparatus as set forth in claim 3 wherein said gate circuit is adapted to pass only signals that exceed the black level of the transmitted signal.

References Cited in the file of this patent

UNITED STATES PATENTS

| | | |
|---|---|---|
| 2,539,440 | Labin | Jan. 30, 1951 |
| 2,546,972 | Chatterjea | Apr. 3, 1951 |